Sept. 1, 1970            A. S. KISH            3,526,416

PUSH-ON FITTING FOR USE WITH NYLON OR RUBBER HOSES

Filed Dec. 6, 1968            2 Sheets-Sheet 1

INVENTOR.
ARTHUR S. KISH
BY
*Isler & Ornstein*
ATTORNEYS

United States Patent Office 3,526,416
Patented Sept. 1, 1970

3,526,416
PUSH-ON FITTING FOR USE WITH NYLON OR RUBBER HOSES
Arthur S. Kish, Lyndhurst, Ohio, assignor to Murray Corporation, Cockeysville, Md., a corporation of Maryland
Filed Dec. 6, 1968, Ser. No. 781,914
Int. Cl. F16l 33/08
U.S. Cl. 285—12                              2 Claims

ABSTRACT OF THE DISCLOSURE

A push-on fitting for use in conjunction with either nylon or rubber hoses, the fitting being characterized by the use of separate and independent sets of ribs or barbs which are especially designed for such hoses. A feature of the invention is the use of a rib of one set to locate the proper position of the hose in relation to the other set of ribs, prior to clamping of the hose to the fitting.

---

In my copending application, Ser. No. 711,644, filed Mar. 8, 1968, and now abandoned, there is disclosed a means for providing leak-proof joints between fittings and hoses in automotive air-conditioning systems, wherein the fitting is provided with projections, and a hose clamp is employed to clamp the hose to the fitting, without cutting, shearing or distortion of the hose, irrespective of the clamping pressures employed. The hose employed is a type of hose especially designed for carrying a refrigerant of the Freon type, consisting of an extruded inner core of a plastic such as nylon, a reinforcing layer of braided nylon cord, and a covering or sheath of thin sheet nylon.

In my copending application, Ser. No. 756,530, filed Aug. 30, 1968, there is disclosed a hose assembly or connection which is used generally in hydraulic systems, such as automotive air conditioning systems, power steering and braking systems, and other industrial applications, wherein a standard type of hose, made, for example, of seamless oil-resistant synthetic rubber, is employed, and the hose is clamped to a tube or nipple. The hose usually consists of an extruded rubber inner core, a reinforcing layer or layers of braided rayon, cotton or nylon, and a covering or sheath of extruded rubber.

The present invention is directed to a fitting, which is so designed that it may be used in conjunction with either of the above-described hoses selectively, and with a hose clamp, to provide leak-proof joints of the character described, to thereby enable a single fitting to be used with both types of hoses.

Another object of the invention is to provide a fitting of the character described, provided with two sets of hose-engaging annular or circumferential ribs or barbs, each set of ridges being of different design or construction from the other and being of a construction or design particularly adapted for use with the particular hose, in conjunction with which the fitting is used.

A further object of the invention is to provide a fitting of the character described, in which one of the ribs of one set of ridges is used as a means for locating the proper position of the hose in relation to the other set of ribs, prior to clamping of the hose to the fitting.

Other objects and advantages of my invention will be apparent during the course of the following description.

In the accompanying drawings forming a part of this specification, and in which like numerals are employed to designate like parts throughout the same.

Figure 1:
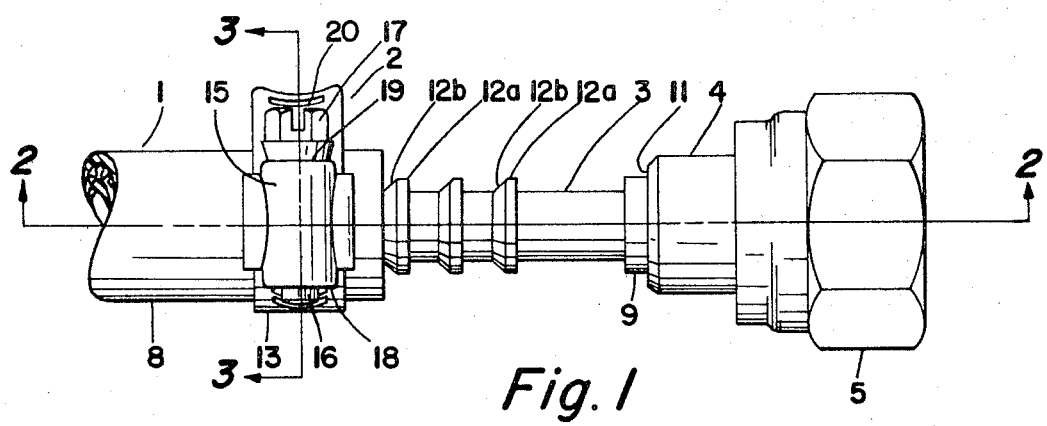
FIG. 1 is a fragmentary plan view of a joint embodying the invention, and in which a hose of the nylon type is employed.
Figure 2:
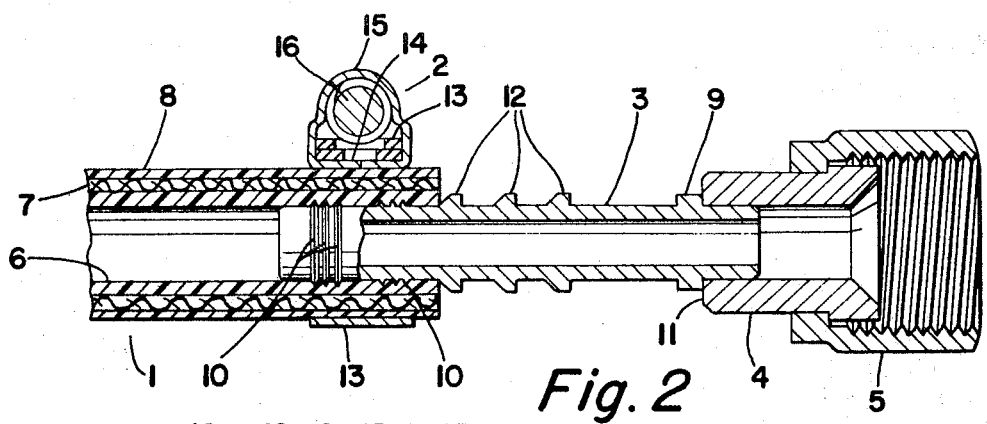
FIG. 2 is a fragmentary cross-sectional view, taken on the line 2—2 of FIG. 1.
Figure 3:
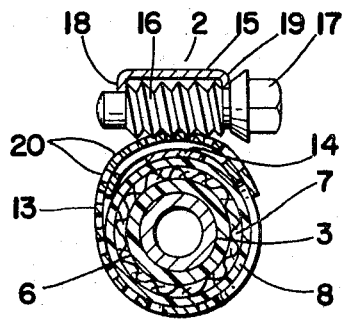
FIG. 3 is a transverse cross-sectional view, taken on the line 3—3 of FIG. 1.
Figure 4:
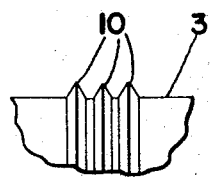
FIG. 4 is a fragmentary view, on an enlarged scale, showing the ridges of one set of ridges.
Figure 5:
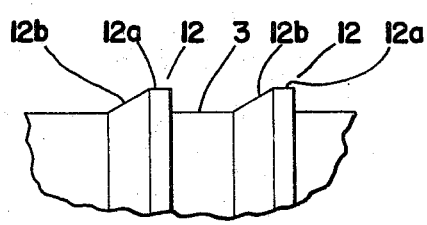
FIG. 5 is a fragmentary view, on an enlarged scale, showing the ridges of the other set of ridges.

Referring more particularly to FIGS. 1 to 5 of the drawings, there is disclosed a joint such as is used in an automotive air-conditioning system, consisting of a hose 1, a clamp 2, a fitting, tube or nipple 3, a seat or adapter 4, and a nut 5.

The hose 1 in this case, is of a type especially designed for carrying a refrigerant of the Freon type, and consists of an extruded inner core 6 of a plastic such as nylon, a reinforcing layer 7 of braided nylon cord, and a covering or sheath 8 of thin sheet nylon.

The fitting, tube or nipple 3, which is a seamless tube made of steel, extends into one end of the hose, and is provided at one end with an annular flange 9, which serves a purpose to be presently described. The portion of the tube 3 which extends into the hose is provided with two longitudinally-spaced series of axially-spaced circumferential or annular ribs 10, of triangular cross-section which project from the outer surface of the tube and are adapted to embed themselves in the inner wall of the core 6 of the hose 1, when the hose is clamped to the tube 3, in a manner to be presently described. It may be noted, at this point, however, that the inner diameter of the hose 1 and the outer diameter of the tube 3 are substantially the same, so that the hose can be easily pushed onto the tube, and the height of the ribs is relatively small, i.e., of the order of about .012″, so that the hose can be readily pushed over the ridges, prior to clamping of the hose to the tube.

The portion of the tube 3 which extends beyond the flange 9 extends into one end of the seat or adapter 4, and the tube is brazed to the adapter by copper brazing the flange 9 to the end 11 of the adapter, thereby providing a leak-proof seal between the tube and the adapter.

The nut 5 is mounted on the adapter 4, to thereby provide with the adapter a means for connection to other parts of the air-conditioning system.

Between the flange 9 and the ribs 10, the tube 3 is provided with three longitudinally-spaced circumferential or annular ribs 12, which project from the outer surface of the tube, and which serve a purpose to be presently described.

Each of the ribs 12 has a surface 12a which is concentric with the outer surface of the tube 3, and a conical surface 12b, which extends from one end of the surface 12a to the outer surface of the tube, and is disposed at that side of each of the ribs 12 which is closest to the ribs 10. It may be noted, at this point, that the height of the ribs 12 is about 2½ times the height of the ribs 10, that is to say, of the order of about .030″.

In assembling the hose 1 with the fitting or tube 3, the hose, as previously stated, is pushed onto the tube and over the ribs 10 until the hose comes into engagement with the first of the ribs 12, so that said rib provides, in effect, a stop to determine the proper position of the hose with respect to the tube. This fit, in the absence of some means to clamp the hose to the tube, is insufficient to provide a fluid-tight seal between the tube and the hose.

This fluid-tight seal is provided by means of the clamp 2. The clamp 2 comprises a stainless steel band 13, one end of which is secured to the lower portion 14 of a housing which comprises said lower portion 14 and an upper portion 15. The upper portion 15 of the housing is of semi-cylindrical form, and has mounted therein a worm gear 16 having a slotted head 17 which is disposed externally of the housing portion 15. The worm gear 16 is rotatable within the housing portion 15, but is locked against endwise displacement from the housing by means of end flanges 18 and 19 which abut the ends of the worm gear.

The other end of the stainless steel band 13 extends into the space between the first-named end of the band and the worm gear 16, that is to say, it lies in overlapping relationship with the first-named end of the band. It is provided with longitudinally-spaced slots 20 which are the equivalent of gear teeth, so that when the head 17 of the worm gear is turned by means of a screw driver, the band may be contracted to any desired diameter, down to approximately ⅝″ to ¼″.

The contraction of the band 13, for the purpose of clamping the hose 1 into fluid-tight sealing relationship with the tube or nipple 3, causes the ribs 10 of the tube to become embedded in the inner wall of the core 6 of the hose. At the same time, this seal is improved by reason of the engagement of the end of the hose 1 with the inclined surface 12b of the rib 12.

Figure 6:
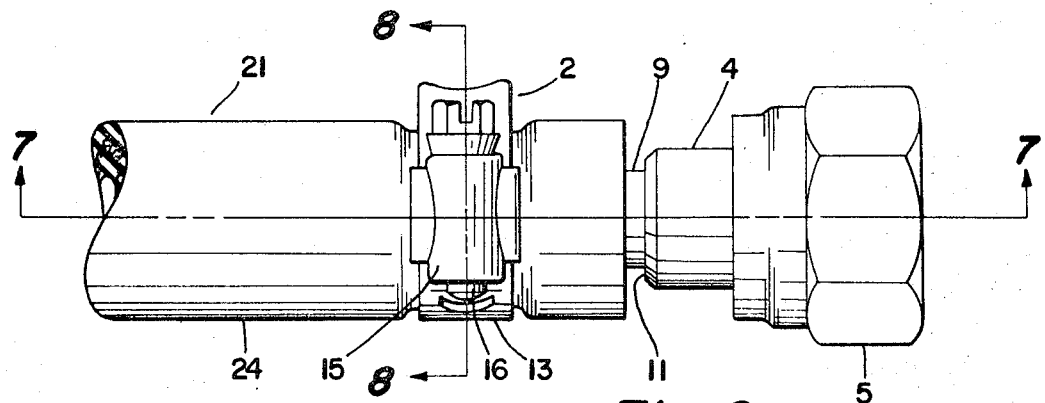
FIG. 6 is a view similar to FIG. 1, but in which a hose of the rubber type is employed.
Figure 7:
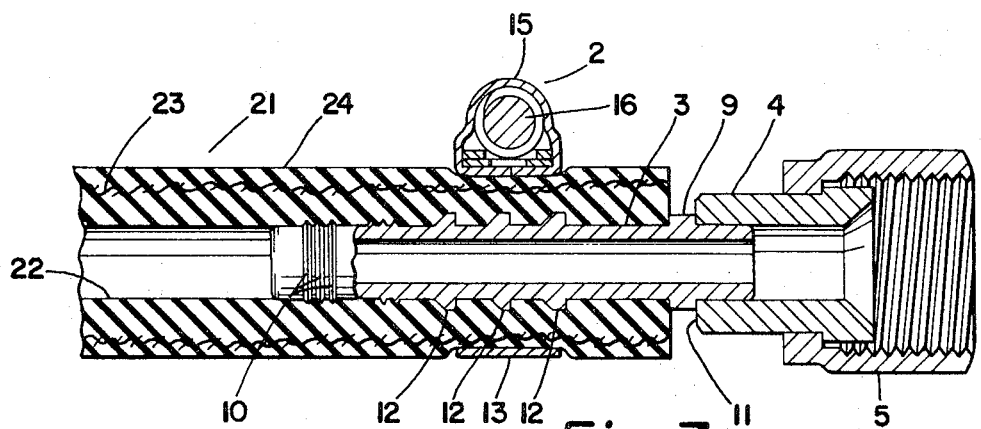
FIG. 7 is a fragmentary cross-sectional view, taken on the line 7—7 of FIG. 6.
Figure 8:
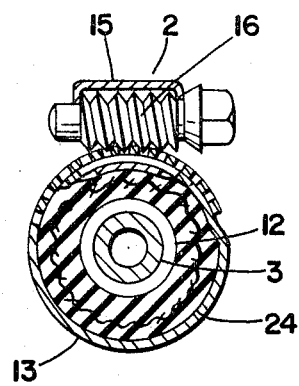
FIG. 8 is a transverse cross-sectional view, taken on the line 8—8 of FIG. 6.

Referring now to FIGS. 6, 7 and 8 of the drawings, there is disclosed a joint consisting of a hose 21, a clamp 2, a fitting, tube or nipple 3, a seat or adapter 4, and a nut 5.

All of these parts, with the exception of the hose 21, are identical with those already described.

The hose 21 in this case is of a type used generally in hydraulic systems, such as automotive air conditioning systems, power steering and braking systems, and consists of an extruded rubber inner core 22, a reinforcing layer 23 of braided rayon, cotton, or nylon, and a covering or sheath 24 of the extruded rubber. The inner diameter of the hose 21 and the outer diameter of the tube 3 are substantially the same, but the outer diameter of the hose 21 is virtually twice that of the hose 1.

In assembling the hose 21 with the tube 3, the hose is pushed onto the tube and over the ribs 10 as well as the ribs 12, until the hose comes into engagement with the flange 9 of the tube, so that the flange 9 provides, in effect, a stop to determine the proper position of the hose with respect to the tube.

Although the ribs 12, as previously stated, are substantially higher than the ribs 10, due to the fact that the core 22 of the hose is of relatively soft rubber, as well as the fact that the movement of the hose is facilitated by reason of the inclination of the surfaces 12b of the ribs 12, the hose can be readily pushed over the ribs 12 to the flange 9. This fit, however, in the absence of the use of the clamp 2, is insufficient to provide a fluid-tight seal between the tube and hose.

This fluid-tight seal is provided by means of the clamp 2. The contraction of the band 13 of the clamp 2, for the purpose of clamping the hose 21 into fluid-tight sealing relationship with the tube or nipple 3, causes the ribs 12 of the tube to become completely embedded in the inner wall of the core 22 of the hose.

It is thus seen that I have provided a fitting, which by virtue of the two separate and independent sets of ribs employed therein may be used selectively in conjunction with either of the two types of hoses described, and with a clamp, to provide leak-proof joints of the character described, thereby to enable a single fitting to be used with both types of hoses.

It is also seen that I have provided a fitting in which each set of ribs is of different design or construction from the other, and each set being of a construction or design which is particularly adapted for use with the particular hose, in conjunction with which the fitting is used.

It is further seen that one of the ribs of the set of ribs 12 is utilized as a means for properly locating the end of the hose 1 in relation to the set of ribs 10, prior to clamping of the hose to the fitting.

It is to be understood that the form of my invention, herewith shown and described, is to be taken as a preferred example of the same, and that various changes may be made in the shape, size and arrangement of parts thereof, without departing from the spirit of the invention.

Having thus described my invention, I claim:

1. In combination with a hose, a multipurpose fitting comprising a tubular element having an outer cylindrical surface of substantially constant diameter and two groups of circumscribing, outwardly projecting ribs spaced axially along said surface and a flange at one end, the first group of ribs adjacent the flange being of larger peripheral diameter than the second group of ribs more remote from said flange, a hose telescoped over said tubular element and embracing the second group of ribs irrespective of the position of the end of the hose, said hose in one position having its end in abutment with the last rib of said first group of ribs and in a second position having its end in abutment with said flange whereby it further embraces said second group of ribs, clamping means surrounding said hose and movable therealong to either one of two selected positions whereby said hose may be clamped around either one or the other of said groups of ribs selectively depending upon the position of the end of the hose, said rib acting as a stop means for the end of said hose when said hose is of the type having inner and outer resilient plastic layers and an intermediate reinforcing layer, said flange acting as a stop means for the end of said hose when said hose is of the type having inner and outer layers of extruded rubber and an intermediate reinforcing layer therebetween.

2. The combination as defined in claim 10, wherein said second group of ribs are of triangular cross-section and said first group of ribs have a cross-section defined by a peripheral surface concentric with the outer surface of said fitting and a conical surface extending from one end of said peripheral surface toward the outer surface of said tubular element, said conical surface being disposed at that side of said ribs which is closest to said second groups of ribs.

References Cited

UNITED STATES PATENTS

| | | | |
|---|---|---|---|
| 858,575 | 7/1907 | Claflin | 285—259 X |
| 1,410,405 | 3/1922 | Johnson | 285—259 X |
| 1,428,949 | 9/1922 | Eastman | 285—259 X |
| 1,778,244 | 10/1930 | Cadden | 285—259 X |
| 2,446,599 | 8/1948 | Knaggs | 285—259 |
| 2,661,225 | 12/1953 | Lyon | 285—259 X |
| 2,833,567 | 5/1958 | Bacher et al. | 285—259 X |
| 3,174,777 | 3/1965 | Lodholm et al. | 285—259 X |
| 3,224,794 | 12/1965 | Crissy | 285—259 X |
| 3,347,571 | 10/1967 | New | 285—256 X |
| 3,389,442 | 6/1968 | Tetzlaff | 285—252 X |
| 791,377 | 5/1905 | Stapley | 285—12 |
| 1,357,153 | 10/1920 | Dicken | 285—12 |
| 2,139,745 | 12/1938 | Goodall | 285—253 |

FOREIGN PATENTS

| | | |
|---|---|---|
| 416,118 | 9/1934 | Great Britain. |
| 878,805 | 11/1942 | France. |

THOMAS F. CALLAGHAN, Primary Examiner

U.S. Cl. X.R.

285—253, 259